United States Patent [19]

Poulin

[11] Patent Number: 4,666,026
[45] Date of Patent: May 19, 1987

[54] DRIVE MECHANISM

[76] Inventor: Yvan Poulin, 370 Martin Street, Milton, Ontario, Canada, L9T 2R6

[21] Appl. No.: 579,251

[22] Filed: Feb. 13, 1984

[51] Int. Cl.$^4$ .......................................... F16H 25/12
[52] U.S. Cl. .................................. 192/141; 74/89.15; 74/412 TA; 192/143; 200/47; 318/286; 318/468; 318/475; 340/668
[58] Field of Search ................. 49/336, 337; 74/89.15, 74/411, 109, 412 TA; 192/141, 143; 200/47; 318/286, 468, 469, 475; 340/668

[56] References Cited

U.S. PATENT DOCUMENTS

| | | | |
|---|---|---|---|
| 205,217 | 6/1878 | Sherman | 49/336 |
| 1,345,110 | 6/1920 | Yungling | 74/411 |
| 2,307,865 | 1/1943 | Slater | 74/411 |
| 2,561,623 | 7/1954 | Hall | 49/337 |
| 2,753,969 | 7/1956 | Chung | 318/475 |
| 2,941,133 | 6/1960 | Springer et al. | 318/286 X |
| 3,453,898 | 7/1969 | Kopczynski | 74/109 |
| 3,682,283 | 8/1972 | Sato | 192/143 |
| 3,688,592 | 9/1972 | Kopczynski | 74/109 |
| 4,111,070 | 9/1978 | Stratienko | 192/141 |
| 4,114,747 | 9/1978 | Eller | 192/143 |
| 4,159,599 | 7/1979 | Richmond | 49/140 |
| 4,231,190 | 11/1980 | Tieben | 49/25 |
| 4,425,814 | 1/1984 | Dick | 74/470 |
| 4,459,867 | 7/1984 | Jones | 74/89.15 |
| 4,485,727 | 12/1984 | Shollenbarger | 74/89.15 |
| 4,498,350 | 2/1985 | Ross | 74/89.15 |
| 4,507,041 | 3/1985 | Church et al. | 74/89.17 X |

FOREIGN PATENT DOCUMENTS

| | | | |
|---|---|---|---|
| 568111 | 3/1924 | France | 49/337 |
| 712311 | 7/1931 | France | 74/411 |
| 755405 | 11/1933 | France | 74/411 |
| 1393860 | 2/1965 | France . | |
| 285292 | 5/1931 | Italy | 49/324 |
| 412447 | 12/1945 | Italy | 74/411 |
| 1354490 | 5/1974 | United Kingdom | 318/469 |

Primary Examiner—Allan D. Hermann
Attorney, Agent, or Firm—Kenneth M. Garrett

[57] ABSTRACT

A drive mechanism comprises a support upon which a drive member is mounted for movement relative to a frame. The drive member comprises first and second elements which are relatively movable, the one of which may be mounted on the other. The elements are interconnected by a resilient member which transmits the drive therethrough, a drive input being coupled to a one element, a drive output to the other element. A detector generates a signal output responsive to relative movement of the elements which may serve to control a drive transmitted through the mechanism. In a preferred embodiment, the support is a rotatable screwed shaft and the first element a traveller thereon upon which the second element is slidably mounted, the elements being interconnected by helical springs.

19 Claims, 2 Drawing Figures

DRIVE MECHANISM

FIELD OF INVENTION

This invention relates broadly to drive mechanisms. It particularly relates to drive mechanisms wherein there is made provision for limiting the force transmitted therethrough. While it is particularly described in relation to a barrier gate device, it is not limited to this application.

BACKGROUND OF INVENTION

Force limiting mechanisms of the general type contemplated herein normally comprise a worm shaft meshed with a worm gear. The shaft is mounted for rotary movement about its axis, and also for a linear movement along its axis. Biasing means, typically comprising one or more springs, serves to maintain the axial position of the shaft. As the load transmitted by the drive mechanism increases, so the biasing means is progressively overcome, and the lateral movement of the worm shaft may serve to actuate a drive control function such as a brake or clutch directly, or indirectly through appropriate switch mechanism.

Drive mechanisms of this type are relatively complex, and may require, for example, two part shafts which are telescopically slidable along splines which transmit the rotary drive force therebetween, and tend to be unnecessarily complex. They are, moreover, relatively restrictive in the type of motion that may be transmitted therethrough, this being essentially rotary motion.

OBJECTS OF THE INVENTION

It is an object of my invention to provide improvements to force limiting drive mechanisms.

It is another object of my invention to provide force limiting drive mechanism that are relatively simple in construction and which may correspondingly be economically advantageous.

It is still another object of my invention to provide force limiting drive mechanisms that may be relatively simple and yet which may be quite sensitive in detecting overload conditions.

It is yet another object of my invention to provide force limiting drive mechanisms which may serve ready to transmit linear or rotary motion, and to provide a ready translation therebetween should this be desired.

SUMMARY OF THE INVENTION

In accordance with the broad aspects of my invention, a drive mechanism comprises a frame and a support member mounted from the frame. A drive member is mounted from the support for movement thereon. The drive member commprises first and second relatively movable elements which are drivingly interconnected by a resilient means. Drive input means is connected to a one element, and drive output means is connected to the other.

Expediently, the drive member may be mounted from the support by the first element, and the second element mounted from the first so as to be movable with respect to the first element.

Where the support member is a shaft, it may be axially fixed relative to the frame, with the drive member movable therealong under the influence of the drive input means. The shaft may be mounted for rotary movement about its longitudinal axis, and it and the first element provided with cooperating threads whereby the drive member moves along the shaft as the shaft rotates, in this instance the shaft is adapted to serve as the drive input means. It will be understood that in such embodiment the drive member is constrained from rotation. When the shaft is threaded, the drive input may most conveniently be rotary. On the other hand, where the drive member simply slides on the shaft, the drive input may conveniently be linear. The drive output from the second element of a drive member will normally be linear where the support is a shaft along which the drive member moves. In accordance with the preferred embodiment, a rack gear is mounted on the second element, and a pinion coupled thereto to translate to movement of the second element to a rotary output.

In accordance with other aspect of the invention, resilient means for constraining relative movement of the first and second elements of the drive member is conveniently provided by spring means. In accordance with the preferred embodiment the spring means comprises a pair of helically wound compression springs respectively located at each axial side of the elements, which springs may have somewhat different spring characteristics to match different loads for transmission in opposed directions. Preferably means is provided for adjusting the spring means so as to vary the transmission characteristics of the drive member.

In accordance with still other aspects of the invention, the drive control mechanism includes means for detecting the relative movement of said first and second elements and for providing a control signal responsive thereto. The term control signal is used in a broad sense, so as to include any type of signal output which is normally associated with load limiting drive mechanisms, for example, and without limitation, such as may be used to control the power input to the drive mechanism or the load to which the drive mechanism is subject, or, as is particularly described herein in relative to the preferred embodiment, to reverse the direction of the drive. Such signal may be used directly, or indirectly by enabling other mechanisms as are generally known for this purpose.

The invention will now be further described in relation to a preferred embodiment thereof, from which the above objects and advantages and still other objects and advantages will become more clear, taken in conjunction with the accompanying drawings.

DESCRIPTION OF A PREFERRED EMBODIMENT

Figure 1:
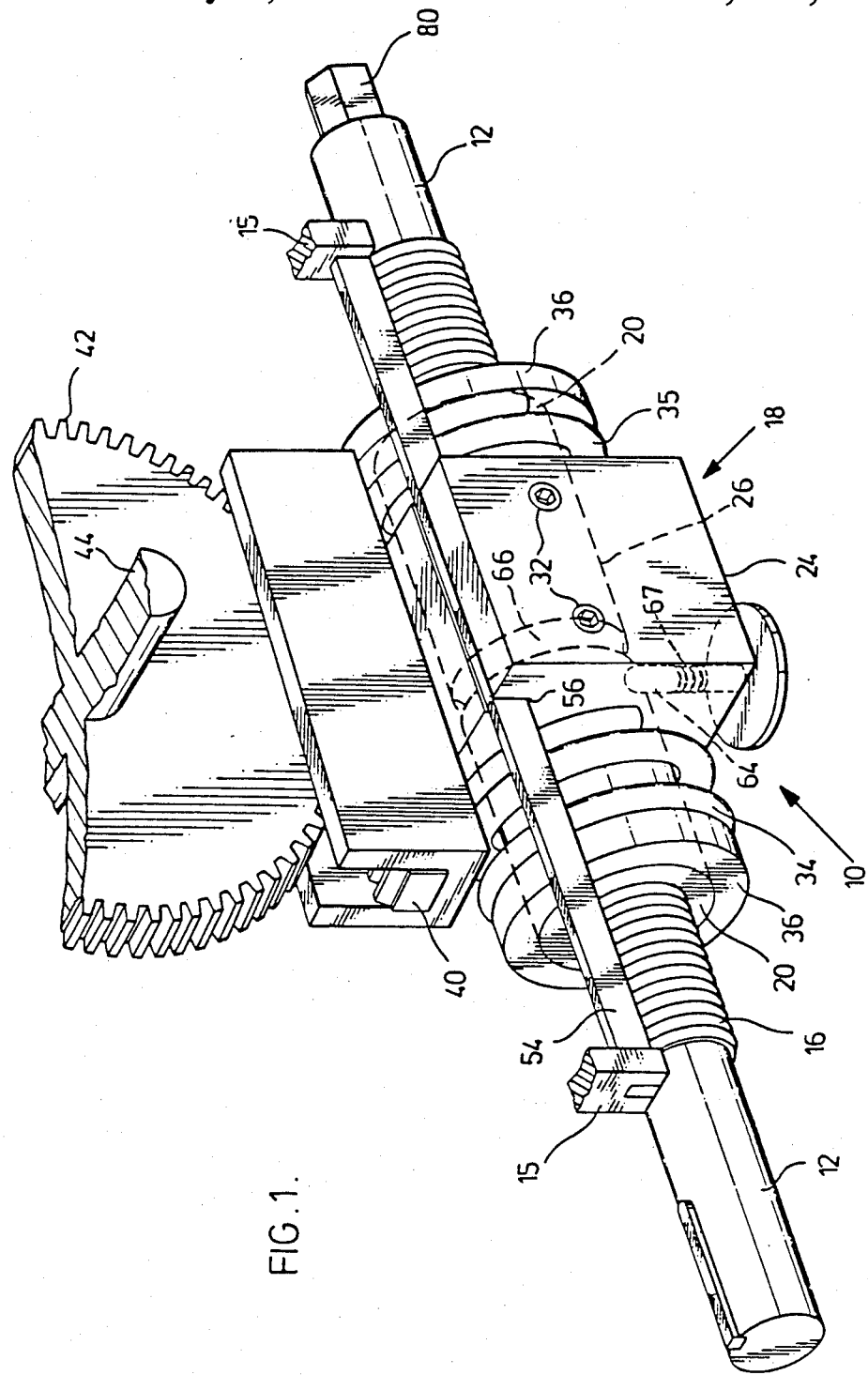
FIG. 1 shows in isometric view a drive mechanism in accordance with the invention, partially broken away.
Figure 2:
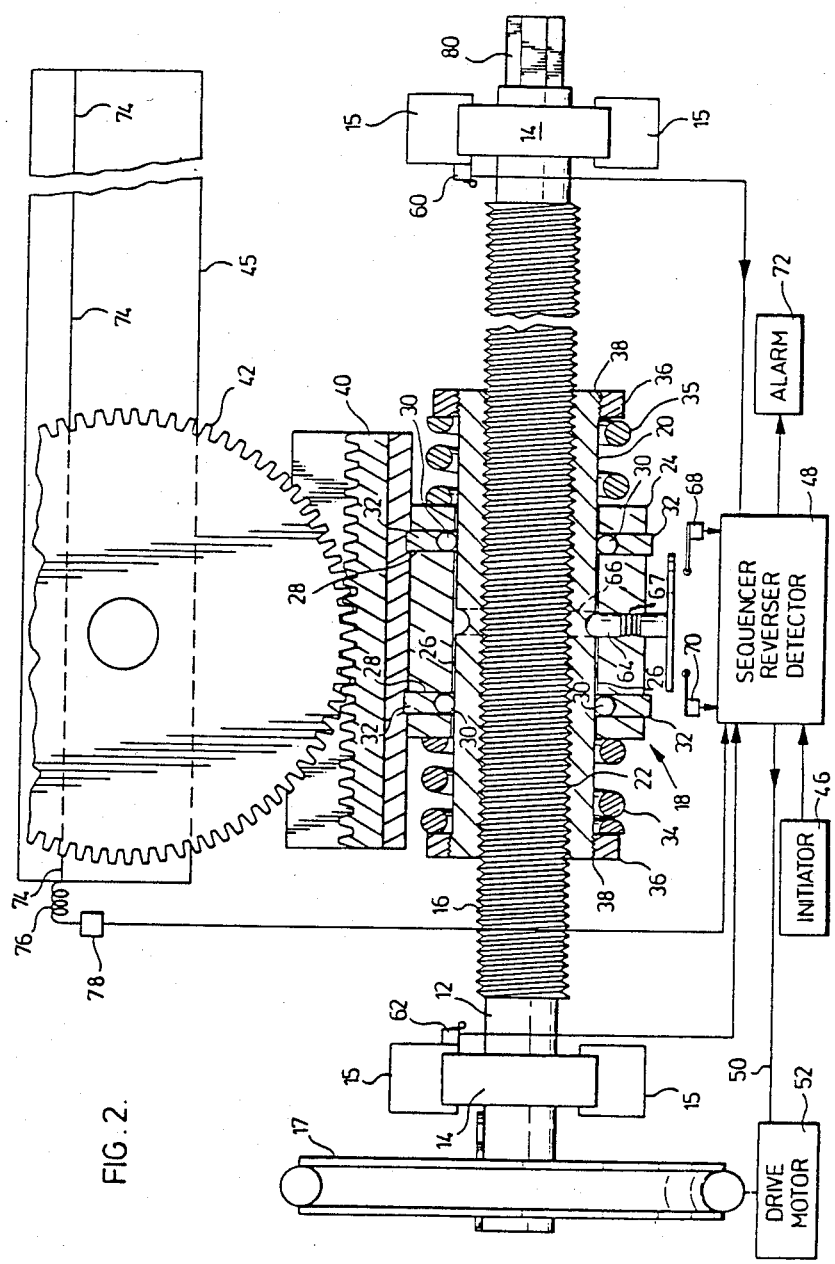
FIG. 2 is a vertical axial section of the drive mechanism of FIG. 1 as adapted for use in a barrier gate device.

Referring to the drawings in detail, a drive mechanism for a barrier gate is identified therein generally by the numeral 10. Drive 10 comprises a shaft 12 mounted for rotary movement about its longitudinal axis by bearings 14 which are supported from a frame 15 of the barrier gate and which retain shaft 12 in an axially fixed position. Shaft 12 is threaded at 16, and a pulley 17 connects thereto. A drive member 18 is supported on shaft 12. Drive member 18 comprises a first tubular element 20 which is internally threaded at 22, to form a traveler on shaft 12, and a second element 24 having a bore 26 therethrough within which the first element 20 is slidably receivable, the elements thus being freely movable with respect to each other. A rolling surface contact to reduce friction between the first and second elements of drive member 18 is formed by providing a plurality of transverse openings 28 located at intervals in the wall of second element 24 in communication with bore 26, and in which locate balls 30 which are retained in place by screwed plugs 32 so as to bear on the outer surface of the first element 20. First element 20 is suitably formed from a acetal resin, for example Delrin ®, to reduce wear and friction between it and screwed rod 16.

Second element 24 is biased to a central position on tubular element 20 by helical springs 34,35 which bear on flanges 36 locating adjacent the axially opposed ends of the first element 20. Flanges 36 are expediently connected to the first element 20 by screw threads 38, so as to control the compression of springs 34,35 and the position of the second element relative to the first element under no-load conditions.

A rack 40 is secured to second element 24 of drive member 18 in axial alignment with shaft 12. A pinion 42 having a shaft 44 is supported from frame 15, and a barrier arm 45 in turn secures to shaft 44 to be driven thereby. The barrier gate comprises an user operable initiator switch 46, which enables a sequencer block 48, this acting to provide power on line 50 to motor 52, which is drivingly coupled to pulley 17, thereby rotating shaft 12. Rotation of shaft 12 causes drive member 18 to travel along the shaft, due to the drive member being precluded from rotating by an anti-torque bar 54 which mounts adjacent each end from frame 15 in parallel relationship with shaft 12, and which engages a notch 56 which is expediently formed in second element 24 of the drive member. In order to prevent rotation of first element 20 relative to second element 24, one of the elements may be provided with an axial groove or grooves and the other a mating projection or projections slidable therealong, which projections may be formed at least in part by balls 30. The movement of drive member 18 is transmitted via rack 40 and pinion to shaft 44, to cause barrier arm 45 to be raised, or lowered, depending upon the direction of rotation of motor 52. The degree of movement of barrier arm 45 may conveniently be controlled by sequencer 48, together with limit switches 60,62, an enabling signal therefrom also causing the reversal of connection to motor 52, and the initiation of a timed interval when the barrier gate is in its elevated position before which motor 52 is again actuated on line 50.

Assuming an impediment to block the movement of barrier arm 45, second element 24 of the drive member 18 will be correspondingly blocked, and first element 20 will move relative thereto as shaft 12 is rotated. Such relative movement is detected by a finger 64 which passes through the lateral wall of second element 24 and which is biased by a spring 67 into a detent groove 66 formed in the outer surface of the first member. Relative movement of the first and second elements of the drive member 18 causes finger 64 to be forced outwardly, thereby switching a switch 68 to a different state. The signal from switch 68 is applied to sequencer block 48 causing a reversal of motor 52.

The degree of relative movement of the first and second elements of drive member 18 experienced under any particular load condition experience at shaft 44 will depend primarily upon the stiffness of springs 34,35, which are accordingly selected appropriately with the load. Since the load will normally be somewhat greater when barrier arm 45 is being raised than when it is lowered, the one spring may be selected to have a somewhat greater stiffness than the other. Springs 34,35 can be compressed and preloaded by suitable adjustment of screwed flanges 36, to further control the relative movement of the first and second elements of the drive member 18, and also to ensure the engagement of finger 64 into detent groove 66 under normal load conditions.

Barrier gates are often installed in isolated, unattended positions, and it is desirable to monitor the condition thereof. Drive mechanism 10 further serves to detect the load on output shaft 44 when the drive mechanism is stationary. Thus a load applied to barrier arm 45 is ultimately transmitted to second element 24 of drive member 18, causing it to move relative to the first element 20, and thereby displace plunger 64 and so alter the state of a switch 70, to enable an alarm 72.

In order to further monitor the condition of the barrier gate I provide a trip wire 74 which may be expediently embedded below the surface of barrier arm 45, and which is maintained under tension by spring 76. The inboard end of the trip wire connects to a centre off toggle switch 78, whereby the state of the switch 78 is altered should the tension in trip wire 74 increase or decrease, as may occur when barrier gate is broken, to provide a signal to alarm 72.

In order to actuate the drive mechanism 10 in the event of a power failure or the like, I provide shaft 12 with a hexagonal end 80 which projects beyond bearing 14, and to which a wrench may be applied, whereby barrier arm 45 may be raised or lowered manually.

While my invention has been particularly described with reference to a preferred embodiment, this is exemplary only of one form thereof, and is not to be considered as limiting at least the broad aspects of my invention.

I claim:

1. A drive mechanism comprising:
   a frame;
   an axially extending shaft mounted from said frame;
   a drive member comprising a first element mounting said drive member for movement along said shaft and a second element coaxial with and slidingly mounted from said first element;
   a radially outwardly extending shoulder mounted adjacent each axial end of said first element, each said shoulder being axially outwardly spaced apart from an adjacent axial end of said second element;
   spring means located between each said radial shoulder and an adjacent said axial end of said second element to couple said first and second elements;
   drive input means connected to one of said first and second elements;
   drive output means connected to the other of said first and second elements,
   and means for detecting relative movement of said elements and providing a signal responsive thereto.

2. A drive mechanism as defined in claim 1, wherein at least one said shoulder is mounted from said first element by threaded means to permit said axial spacing between said shoulder and said adjacent axial end of said second element to be adjustably pre-set.

3. A drive mechanism as defined in claim 1, wherein each said shoulder is mounted from said first element by threaded means to permit said axial spacing between said shoulders and the respective axial ends of said second element to be adjustably pre-set.

4. A drive mechanism as defined in claim 3, wherein said means mounting said shaft secures said shaft in an axially fixed position.

5. A drive mechanism as defined in claim 4, wherein said shaft is rotatably mounted from said frame.

6. A drive mechanism as defined in claim 3, wherein said drive input means comprises cooperating threads formed on said shaft and said first element.

7. A drive mechanism as defined in claim 6, wherein said drive member is provided with means for restricting the rotation thereof.

8. A drive mechanism as defined in claim 6, wherein said second element is provided with a bore within which said first element is received to slidingly mount said second element as aforesaid.

9. A drive mechanism as defined in claim 6, wherein said means for detecting said relative movement comprises a detent formed in one of said first and second elements and a finger carried by the other of said first and second elements and spring biased into said detent.

10. A drive mechanism as defined in claim 3, wherein said spring means comprises a helical compression spring.

11. A drive mechanism as defined in claim 10, wherein one said compression spring has a different spring characteristic to the other compression spring.

12. A drive mechanism as defined in claim 3, wherein said drive output means comprises a rack secured to said second element and a pinion meshed with said rack.

13. The drive mechanism of claim 12 further including a barrier arm mounted from said pinion.

14. The drive mechanism of claim 13, wherein said barrier arm includes a trip wire for actuating a signal on the breakage of said barrier arm.

15. A drive mechanism as defined in claim 3, wherein said second element is slidingly mounted from said first element by a rolling surface contact means.

16. A drive mechanism as defined in claim 1, wherein means is provided for pre-setting the axial spacing between at least one said shoulder and an adjacent axial end of said second element so as to vary the compressive force of said spring means.

17. A drive mechanism as defined in claim 1, further including means for detecting a predetermined limit position of said drive member on said support and for providing a signal responsive thereto for reversing the direction of movement of said drive input means.

18. A drive mechanism as defined in claim 1, wherein said first element is constructed from a polyacetal resin.

19. A drive mechanism as defined in claim 1, wherein said shaft is provided with manually operable drive input thereto.

* * * * *